United States Patent [19]

Kanerva et al.

[11] Patent Number: 5,793,744
[45] Date of Patent: Aug. 11, 1998

[54] MULTICHANNEL HIGH-SPEED DATA TRANSFER

[75] Inventors: Mikko Kanerva, Helsinki; Juha Räsänen, Espoo; Harri Jokinen, Hiisi; Harri Honkasalo, Helsinki, all of Finland

[73] Assignee: Nokia Telecommunications Oy, Espoo, Finland

[21] Appl. No.: 690,262

[22] Filed: Jul. 24, 1996

[30] Foreign Application Priority Data

Dec. 18, 1995 [FI] Finland ................................ 956087

[51] Int. Cl.⁶ ........................... H04J 3/16; H04J 13/00
[52] U.S. Cl. ......................... 370/209; 370/342; 370/433; 370/468; 371/32
[58] Field of Search .......................... 370/345, 347, 370/348, 412, 417, 433, 468, 476, 498, 517, 458, 209, 342, 441; 371/32, 33

[56] References Cited

U.S. PATENT DOCUMENTS

| | | | |
|---|---|---|---|
| 4,103,336 | 7/1978 | Gindi et al. | 395/285 |
| 5,029,164 | 7/1991 | Goldstein et al. | 370/477 |
| 5,566,208 | 10/1996 | Balakrishnan | 370/468 |

*Primary Examiner*—Benedict V. Safourek
*Attorney, Agent, or Firm*—IP Group of Pillsbury Madison & Sutro LLP

[57] ABSTRACT

A digital mobile communication system has a high-speed non-transparent data connection between a transmitting and a receiving party. For the data connection, parallel subchannels, corresponding in number to the nominal data transfer rate, have been allocated on the radio interface. A radio link protocol is responsible for transmitting data over the radio interface, and for acknowledging correct data frames and for retransmitting defective data frames. A transmission buffer buffers the data frames to be transmitted and stores the data frames transmitted until it receives an acknowledgement of successful reception. In order to reduce interference and power consumption, user data is transmitted by using as many of the allocated subchannels as required by the actual user data rate at any one time. On the other allocated subchannels, transmission is interrupted or discontinuous transmission is applied.

25 Claims, 9 Drawing Sheets

|   | 8 | 7 | 6 | 5 | 4 | 3 | 2 | 1 |   |
|---|---|---|---|---|---|---|---|---|---|
| 0 | SA | SB | x | 0 | 0 | 0 | 1 | 1 |   |
| 1 | 1 | 1 | 0 | 0 | 0 | 1 | 1 | 1 | IA5 "G" |
| 2 | 1 | 1 | 0 | 1 | 0 | 0 | 1 | 1 | IA5 "S" |
| 3 | 1 | 1 | 0 | 0 | 1 | 1 | 0 | 1 | IA5 "M" |
| 4 | SA | SB | x | 1 | 1 | 1 | 1 | 1 |   |
| n |   |   |   |   |   |   |   |   |   |

MULTICHANNEL HIGH-SPEED DATA TRANSFER

FIELD OF THE INVENTION

The present invention relates to high-speed multichannel data services (HSCSD) on a radio interface of a mobile communication system.

BACKGROUND OF THE INVENTION

There are several multiple access modulation techniques for facilitating communications in which a large number of mobile users are present. These techniques include time division multiple access (TDMA), code division multiple access (CDMA) and frequency division multiple access (FDMA).

In mobile telecommunication systems of the time division multiple access (TDMA) type, time-division communication takes place on the radio path in successive TDMA frames, each of which consists of several time slots. In each time slot, a short information packet is sent as a radio frequency burst which has a finite duration and which consists of a set of modulated bits. The time slots are mainly used for transmitting control channels and traffic channels. On the traffic channels, speech and data are transmitted. On the control channels, signalling between a base station and mobile subscriber stations is carried out. An example of a TDMA radio system is the Pan-European mobile communication system GSM (Global System for Mobile Communications).

CDMA is a modulation and multiple access scheme based on spread spectrum communication. Unlike FDMA or TDMA, in CDMA a large number of CDMA signals (users) simultaneously share the same wide band radio channel, typically 1.25 MHz. Pseudorandom noise (PN) binary codes, so-called spreading codes, are used to distinguish between different CDMA signals, i.e. traffic channels on said wide band radio channel. A separate spreading code is used over each connection between a base station and a subscriber terminal. In other words, the narrow-band data signal of the user is conventionally multiplied by the dedicated spreading code and thereby spread in bandwidth to the relatively wide band radio channel. The signals of the users can be distinguished from one another in the receivers on the basis of the unique spreading code of each connection, by using a correlator which accepts only a signal energy from the selected spreading code and despreads its spectrum into a narrow-band signal. The other users' signals, whose spreading codes do not match, are not despread in bandwidth and as a result, contribute only to the noise and represent a self-interference generated by the system. The spreading codes of the system are preferably selected in such a way that the codes used in each system cell are mutually orthogonal, i.e. they do not correlate with each other. Thus, in the CDMA systems, the spreading code unique to each user or user's signal provides a traffic channel in a similar sense as a time slot in the TDMA systems. CDMA is described in more detail in the document: "An overview of the application of code division multiple access (CDMA) to digital cellular systems and personal cellular networks", Qualcomm Incorporated, 1992, USA, (Document Number EX60-10010).

In traditional TDMA and CDMA mobile communication systems, the maximum data rate on the radio interface is relatively low.

For communication in conventional mobile communication systems, each mobile station is assigned one traffic channel for data or speech transmission. Thus, the GSM system, for instance, may have up to eight parallel connections to different mobile stations on a same carrier wave. The maximum data transfer rate on one traffic channel is restricted to a relatively low level according to the available bandwidth and the channel coding and error correction used in the transmission, for example in the GSM system to 12 kbit/s, 6 kbit/s or 3.6 kbit/s.

A digital mobile communication system typically uses several connection types which can be divided into two categories: transparent and non-transparent connections. On a transparent connection, data is transferred through a traffic channel of the mobile communication system in a transparent way, which means that error correction on the radio path is carried out by employing channel coding only. In the GSM system the channel coding is Forward Error Correction (FEC). A non-transparent connection uses, in addition to channel coding, an additional protocol in which the data transmission over the traffic channel is repeated in case the data was not received correctly at the other end. In the GSM system, this communication protocol is Radio Link Protocol (RLP), used between a terminal adaptor of a mobile station MS and an interworking function IWF, which is typically at a mobile services switching center MSC. The RLP is a balanced (HDLC type) data transfer protocol having a frame structure. Error correction by the RLP is based on retransmission of frames corrupted on the traffic channel. There is another protocol, Layer 2 Relay (L2R), above the RLP. In the present patent application, the functional part of the TAF or IWF carrying out these protocols is referred to as an L2R/RLP unit.

In a normal data transfer state, the L2R/RLP unit packs user data into 200-bit long protocol data units (PDU), which are transmitted in 240-bit RLP frames over the radio interface to a second L2R/RLP unit. If there is no data or other information to be transferred between the two L2R/RLP units, discontinuous transmission (DTX) may be applied. DTX refers to a method reducing transmission on the radio path to a minimum (i.e. interrupt the transmission) during pauses in the data transfer. The aim is to reduce the power consumption of the transmitter, a very significant matter for the mobile stations, as well as the overall interference level on the radio path, which has an effect on the system capacity. The DTX operates independently for the uplink and downlink directions. The mobile communication network may either allow or prohibit the use of DTX.

In normal L2R/RLP operation, the PDUs are possibly filled only partially, because the application may limit the maximum user rate below the maximum rate on a traffic channel. The PDUs may be full if the actual user data rate on the terminal interface is high enough or if, due to delays caused by re-transmission or some other congestion, the L2R/RLP buffer has enough user data to fill one PDU completely. It is also possible, depending on the implementation, to prefer full PDUs to partially full PDUs. This can be accomplished by using a timer or a counter to slightly delay the building of a PDU until there is enough data available (e.g. in a buffer) for a full PDU to be built, or until the building of a PDU, albeit only a partially full PDU, cannot be delayed any longer. The timer may have a typical value in the order of 20 ms, in other words the repetition period of TDMA frames. The timer value should be relatively short in order not to introduce additional data transmission delays.

However, the data rates of present-day mobile communication networks are not sufficient for the new, high-speed data services. A solution is proposed for introducing higher data rates for mobile communication systems in the applicant's co-pending PCT application WO95/31878, unpublished on the priority date of the present application: two or more parallel traffic channels (subchannels) are used on the radio path for one high-speed data connection. The high-speed data signal is distributed to the parallel subchannels at the transmitting end for the transmission over the radio path, and then combined at the receiving end. In this manner, it is possible to provide data transfer services which, depending on the number of allocated traffic channels, have a transfer rate up to 8 times the conventional data rate. In the GSM system, for example, the total user data transfer rate 19.2 kbit/s is obtained with two parallel subchannels. This principle is also referred to as a multi-slot channel technique. High-speed data service thus obtained are referred to as HSCSD (High Speed Circuit Switched Data) services.

If the user data rate in a HSCSD service is lower than the maximum capacity of the radio link protocol, partially filled PDUs may be built and transmitted over the radio interface in the RLP frames. It is also possible that some subchannels carry full PDUs in their RLP frames and some subchannels occasionally carry partially full or empty PDUs in their RLP frames.

For the mobile station, this inefficient use of transmission capacity may lead to an unnecessarily high power consumption, heating of RF and other elements, and possibly a more complex scheduling of reception, transmission and neighbour cell monitoring than necessary for the actual user data rate.

For the radio interface, this leads to an increased interference, either in the uplink or the downlink direction, or both. For the base station and the IWF, reducing complexity is not that much of an issue as for the MS.

The prior art DTX implementation, and the slightly delayed building of PDUs can relief the situation somewhat but not completely. The DTX is mainly used mainly in cases when there is nothing at all to be transmitted. When some data has to be transmitted (at a low rate), the transmission requiring only a fraction of the allocated bandwidth, the conventional DTX does not suffice.

DISCLOSURE OF THE INVENTION

An object of the present invention is a discontinuous transmission suitable for multichannel high-speed data links.

An aspect of the invention is a method for high-speed data transfer in a digital mobile communication system, the method comprising the steps of establishing a non-transparent data connection having a number of parallel subchannels allocated on the radio interface, said number being determined by a specific maximum transfer capacity; transmitting user data over the non-transparent data connection in data frames by employing a communication protocol which acknowledges data frames received correctly and retransmits defective data frames; buffering data frames to be transmitted in a transmission buffer; storing the data frame transmitted in the transmission buffer for a possible retransmission until an acknowledgement is received from the receiving end; monitoring the actual user data rate on the terminal interface; monitoring fill level of the transmission buffer; transmitting user data in data frames via specific one or ones of said allocated subchannels, the number of said specific ones of said allocated subchannels depending on the actual user data rate and the fill level of the buffer; interrupting transmission on the remaining one or ones of said allocated subchannels which do not belong to said specific ones of said allocated subchannels, if any.

The basic concept of the present invention is to transmit frames of the radio link protocol (RLP) selectively only via specific subchannels in cases the maximum data transfer capacity allocated to the data link is not required. This is important because interleaving on the radio interface spreads an RLP frame over several frames. If the RLP frames were transmitted over arbitrarily selected subchannels without any consistency, many or maybe all allocated subchannels would constantly be "active". According to the present invention, transmissions are concentrated on specific subchannels only, whereas the other subchannels allocated to the connection carry no transmission at all, or they are maintained with as little transfer as possible, for example they employ subchannel-specific DTX or their data rate and/or power is decreased to as low a level as possible. The direct benefits of a lower number of active subchannels include reduced transmitter power consumption, less temperature problems and a simpler timing of reception, transmission, and measuring neighbouring cells. In addition, as the number of unnecessary transmissions on the radio interface is lower, the interference level in the mobile communication network will be lower.

The required minimum number of subchannels can be determined by monitoring the data flow into the transmission buffer, i.e. the actual user data rate. Furthermore, by monitoring the amount of buffered data it is possible to determine whether more active subchannels will be required than said minimum number, and to dynamically increase and decrease the number of subchannels in use. Data amount mentioned above can be represented e.g. data rate, buffer status, number of PDUs or RLP frames etc. Determining the number of subchannels used, and weightings for different subchannels may be based on various mathematical and statistical variables of the amount of input and buffered data, such variables being for example instantaneous value, a fixed average, a moving average, or some other statistical variable (geometric mean, median, etc). This allows the control process to react in a controlled fashion to sudden, slow, temporary or long term changes in the transmission capacity requirements and availability. Such changes may be caused by, for example, handover, bad coverage (temporary or long term), a data transfer request, requested retransmission of corrupted data, allocation of new subchannels to the connection, removal of subchannels from the connection, and changes in the radio interface channel coding.

There are different ways to choose the subchannels on which data transfer will be continued. One of the embodiments of the invention utilizes a subchannel preference list which organizes the subchannels according to principles such as: (1) an order based on the position of subchannels in a frame, (2) a predetermined order which depends on the total number of subchannels on the connection, (3) an order to be negotiated during the connection, or (4) an arbitrary order. Even an arbitrary order is advantageous if maintained the same for the duration of several frames.

BRIEF DESCRIPTION OF THE DRAWINGS

In the following the invention will be described in greater detail by means of the preferred embodiments, with reference to the accompanying drawings, in which.

PREFERRED EMBODIMENTS OF THE INVENTION

In different multiple access methods the physical concept of traffic channel varies, being primarily defined by a time slot in TDMA systems, a spreading code in CDMA systems, a radio channel in FDMA systems, a combination thereof, etc. The basic concept of the present invention is, however, independent of the type of the traffic channel and the multiple access method used.

The present invention can be used in all digital TDMA based data transfer systems on a non-transparent data link comprising several parallel subchannels (e.g. multi-slot access).

Figure 1:
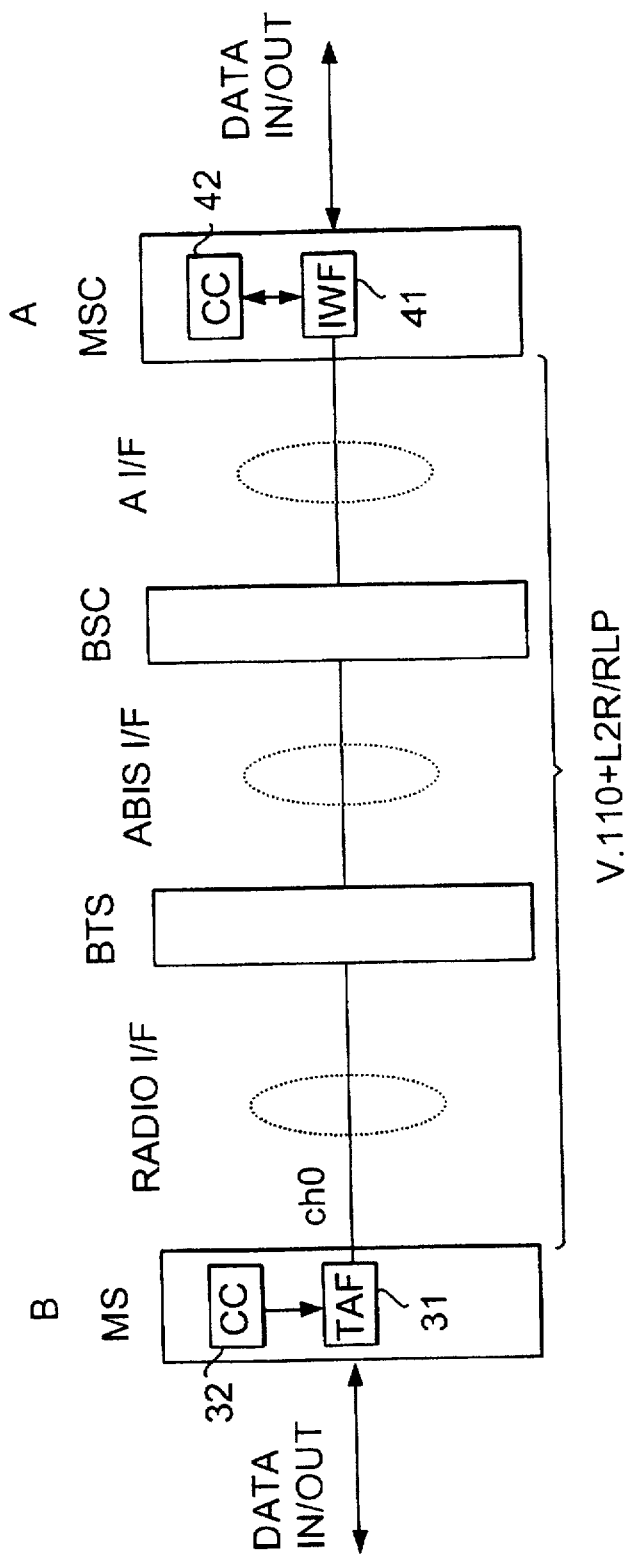
FIG. 1 illustrates a part of a mobile communication system to which the present invention can be applied on a single channel non-transparent connection.

The present invention is particularly well suited to data transfer applications in digital TDMA mobile communication systems, such as the Pan-European digital mobile communication system GSM, DCS1800 (Digital Communication System), a mobile communication system according to the EIA/TIA Interim Standard IS/41.3, etc. Below, the invention will be described by using the GSM system as an example but without restricting the invention to it. FIG. 1 very briefly shows the basic structure of the GSM system, not paying closer attention to its characteristics or other aspects of the system. For a more detailed description of the GSM system, the GSM recommendations and "The GSM System for Mobile Communications", M. Mouly & M. Pautet, Palaiseau, France, 1992, ISBN:2-9507190-0-7, are referred to.

A mobile services switching centre MSC handles the connecting of incoming and outgoing calls. It performs functions similar to those of an exchange of a public switched telephone network (PSTN). In addition to these, it also performs functions characteristic of mobile communications only, such as subscriber location management, jointly with the subscriber registers (not shown) of the network. The mobile stations MS are connected to the center MSC by base station systems BSS. The base station system BSS consists of a base station controller BSC and base stations BTS.

The GSM system is a time division multiple access (TDMA) system in which time-division traffic takes place on the radio path in successive TDMA frames each of which consists of several time slots. In each time slot, a short information packet is sent as a radio frequency burst which has a finite duration and which consists of a set of modulated bits. The time slots are mainly used for transmitting control channels and traffic channels. On the traffic channels, speech and data are transmitted. On the control channels, signalling between a base station and mobile subscriber stations is carried out. Channel structures used on the radio interface of the GSM system are defined in closer detail in the GSM recommendation 05.02. In operating according to the recommendation, at the beginning of a call a mobile station MS is assigned a time slot from a carrier wave as a traffic channel (Single Slot Access). The MS synchronizes to this time slot to transmit and receive radio frequency bursts.

In the GSM system, a data link is established between a mobile station MS network terminal TAF (Terminal Adaptation Function) 31 and a network adaptor IWF (Interworking Function) 41 in the fixed network (usually at the MSC). The data link is a circuit-switched connection which reserves one (or more) traffic channel(s) from the radio interface for the duration of the connection. In the GSM network, the data link in data transfer is a V.110 rate adapted, V.24 interface compatible, UDI coded digital Full Duplex connection. The V.110 connection is originally a digital transmission channel developed for ISDN (Integrated Services Digital Network), specified in the recommendation CCITT Blue Book V.110. The terminal adaptor TAF adapts a data terminal TE connected to the MS for the V.110 connection which in FIG. 1 is established over a circuit-switched connection using traffic channel ch0. The network adaptor IWF adapts the V.110 connection to another V.110 network such as an ISDN or another GSM network, or to another transit network, e.g. the public switched telephone network PSTN.

In addition, the traffic channel employs channel coding FEC (Forward Error Correction) with the aim of reducing the effect of transmission errors on the radio path. The GSM system employs convolution coding according to the GSM recommendation 05.03, the efficiency of which can be illustrated by a convolution coding ratio X/Y, which signifies that X data bits are represented in the channel coding by Y code bits. On a full-rate GSM traffic channel, on user data rates 9.6 kbit/s, 4.8 kbit/s and 2.4, the convolution coding ratios of ½ (punctured), ⅓ and ⅙, respectively, are employed.

The circuit-switched non-transparent connection between the TAF and the IWF on a GSM traffic channel comprises several protocol layers.

Figure 2:
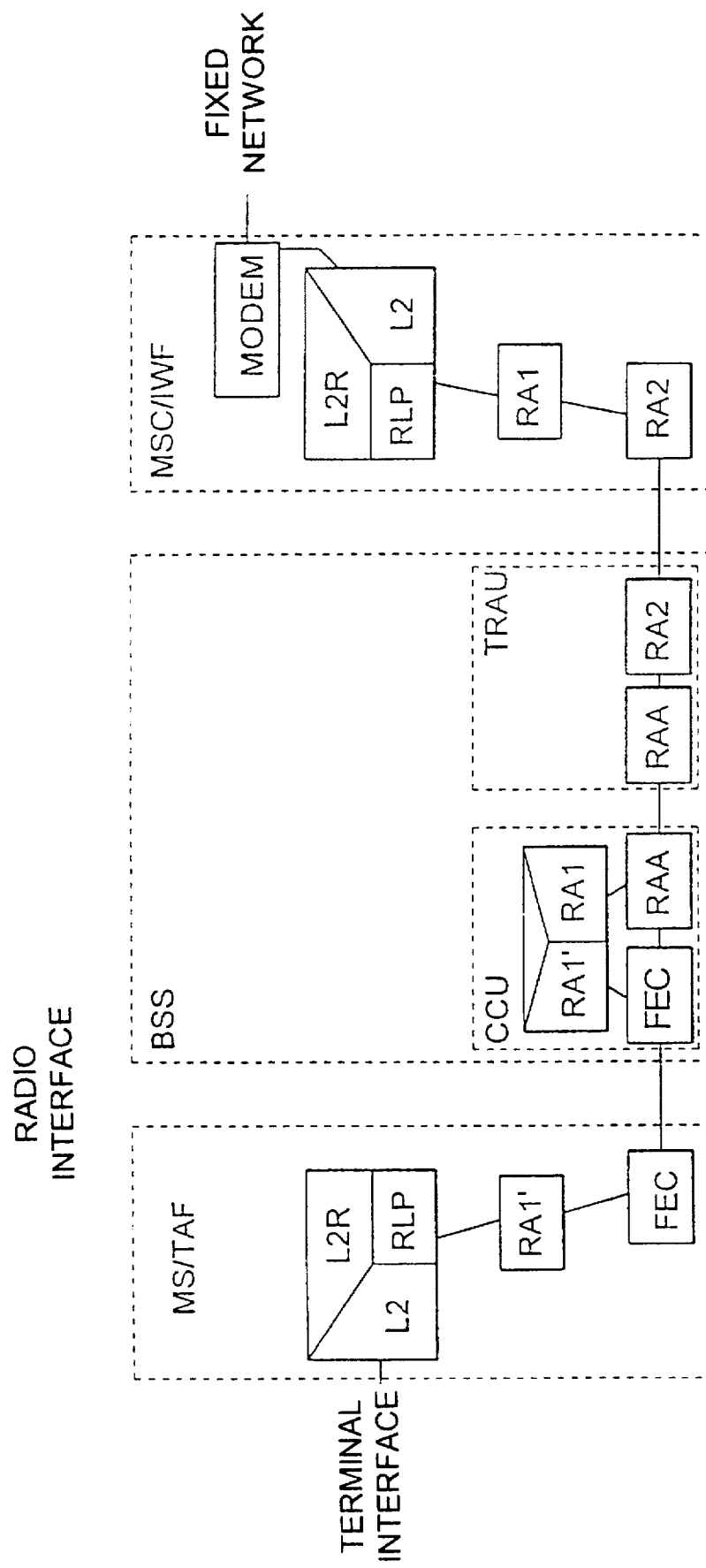
FIG. 2 is a block diagram illustrating the functional units of a single channel non-transparent GSM traffic channel on different protocol levels.

The terminal interface between the MS terminal adaptor TAF and the data terminal equipment, as well as the interface between the IWF and e.g. an audio modem MODEM are in accordance with CCITT V.24, and in FIG. 2 the terminal interface is marked with the symbol L2. As far as the invention is concerned, the interesting protocols are L2R (Layer 2 Relay) and RLP (Radio Link Protocol) which both are at the terminal adaptor TAF and the network adaptor IWF at both ends of the connection. In addition, the connection has, as illustrated in FIG. 2, different kinds of Rate Adaptation (RA) functions, such as RA1' between the TAF and a CCU unit (Channel Codec Unit) located at the BSS, RA1 between the CCU and the IWF, RAA between the CCU and a transcoder unit TRAU placed apart from the base station, and RA2 between the TRAU and the IWF. The rate adaptation RA functions are defined in the GSM recommendations 04.21 and 08.20. Communication between the CCU and the TRAU is defined in the GSM recommendation 08.60.

The information rate-adapted on the radio interface RA1' is furthermore channel-coded the way specified in the GSM recommendation 5.03, illustrated by blocks FEC in the MS and CCU.

The present invention, however, only relates to the L2R/RLP operation of the TAF and the IWF, and communication between them. The other aforementioned lower layer protocols, functions and units only provide a transmission path according to the GSM recommendations between L2R/RLP units, and they are not significant to the present invention with the exception of channel coding FEC. Consequently, the other functions are not described herein in any greater detail.

Figures 3, 4:
FIG. 3 shows a L2R PDU.
FIG. 4 shows an RLP frame.

L2R (Layer 2 Relaying) functionality for non-transparent character-oriented protocols is defined e.g. in the GSM recommendation 07.02. L2R packs the user data and the status information originating from the terminal interface into 200-bit, 25-octet long PDUs (Protocol Data Units), such as the one illustrated in FIG. 3. The octets are numbered 0–24, octet 0 being transmitted first. The bits in the octets are numbered 1–8, bit 1 being transmitted first. In a PDU, the octet may be a status octet, a character (higher layer data) or fill bits. Octet 0 is always a status octet. A status octet comprises 3 bits, SA, SB and X for the status of the V.24 connection, and 5 bits that indicate the number of data octets succeeding the status octet, as well as the special indications of the data octets such as empty and PDU. In FIG. 3, status octet 0 is succeeded by 3 data octets into which the word "GSM" has been packed, after which a new status octet 4 follows.

The L2R PDUs are packed in a frame according to the RLP protocol, such a frame being shown in FIG. 4. The RLP protocol is specified in the GSM recommendation 04.22. The RLP is a balanced (HDLC type of) data transfer protocol with a frame structure, in which error correction is based on retransmitting corrupted frames at the request of the receiving party. The RLP extends from the mobile station MS terminal adaptor TAF to the network adaptor IWF, which is usually located at the MSC. As shown by FIG. 4, the RLP frame structure comprises a header field (16 bits), an information field (200 bits), and a frame check sequence (24 bits). The 200-bit L2R PDU is packed in the information field. As a result, the net RLP data rate is clearly above the maximum 9.6 kbit/s data rate for one channel, which allows a specific number of retransmissions without a decline in the nominal user rate. For example, if the user rate on the terminal interface is 9600 bit/s and the data rate on the radio interface is 12 kbit/s, the "surplus capacity" is, depending on the character structure being used, at least 12.5%.

The transmission buffer buffers the data received from the V.24 interface so that data will not be lost even if the MS is not able to transmit it instantly over the radio interface. A reception buffer buffers data which is transferred to the V.24 interface so that data received from a traffic channel will not be lost even if it cannot immediately be forwarded via the V.24 interface to e.g. the terminal equipment TE. The RLP protocol also includes a flow control, used to adjust the fill level of the transmission and reception buffers. The flow control is specified in the GSM recommendation 07.02. The criterion used to activate the flow control may be a half full transmission or reception buffer.

The maximum user data rate on a single GSM traffic channel is restricted to 9.6 kbit/s.

In high-speed data services (HSCSD), several traffic channels are assigned to a data call; in other words, two or more time slots are assigned from the same TDMA frame. An example of how to carry out high-speed data transfer based on a multitude of traffic channels is disclosed in the applicant's co-pending PCT application WO95/31878 and WO96/18248. However, it should be noted that as far as the invention is concerned, the only significant matter is that a multichannel data link can be established.

Figure 5:
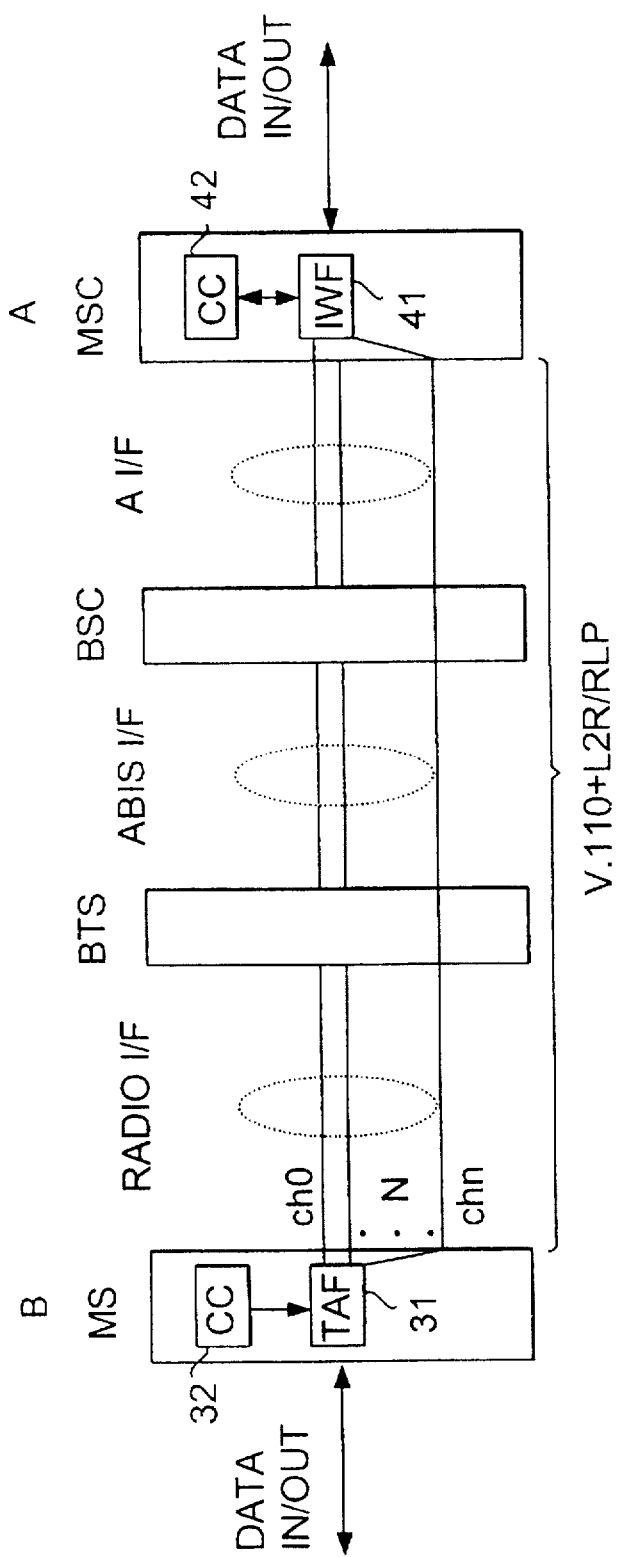
FIG. 5 illustrates a part of a GSM mobile communication system to which the invention can be applied on a multi-channel non-transparent connection.

FIG. 5 illustrates a GSM network architecture implementing such a data transfer on several parallel traffic channels.

FIG. 5 is similar to FIG. 1, with the exception that in FIG. 5 there is, between the TAF and IWF, a circuit-switched non-transparent connection which consists of N parallel traffic channels ch0–chn, where N=1,2,3 .... In the mobile station, the TAF functions as a divider which splits the high-speed data signal DATA IN originating from the data terminal equipment into parallel traffic channels ch0–chn, and a combiner which combines the subsignals received from the parallel traffic channels ch0–chn back into a high-speed data signal DATA OUT. Correspondingly at the other end of the multichannel data link, the IWF functions as a divider which splits the input high-speed data signal DATA IN into parallel traffic channels ch0–chn, and a combiner which combines the subsignals received from the parallel traffic channels ch0–chn back into a high-speed data signal DATA OUT.

The protocol structure of FIG. 2 may also be applied to the FIG. 5 multichannel connection architecture. In the preferred embodiment of the invention, the L2R/RLP unit is common to all the traffic channels allocated for the same connection. Out of these, the RLP at the same time functions as the aforementioned divider and combiner. However, each traffic channel is provided with a dedicated rate adaptation (RA) and channel coding (FEC) functions, as illustrated by FIG. 2. Thus, from the view point of the L2R/RLP unit, the multichannel data link is substantially similar to a single channel link; the "transmission channel" between them only has more capacity than before.

Figure 6:
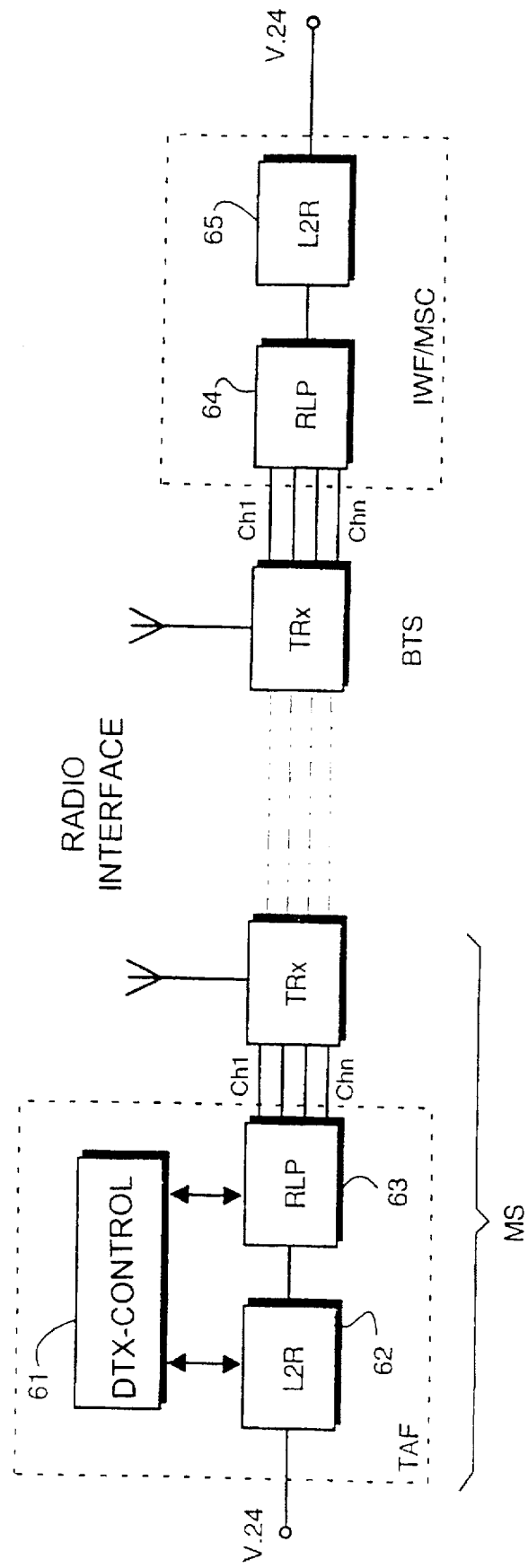
FIG. 6 is a block diagram illustration of an arrangement for an HSCSD connection in accordance with the invention.

The HSCSD connection can also be illustrated by the block diagram of FIG. 6, in which the L2R and RLP protocol functions are distributed into separate units 62 and 63 in the TAF/MS and correspondingly into units 64 and 65 in the IWF/MSC at the receiving end. Unit L2R packs the data in the L2R PDUs as described above. However, in the HSCSD slightly modified PDUs are employed; the number of bits in the PDUs is smaller, i.e. 192. The reason for this is to compensate for the reducing user data rate in the RLP protocol, the reduction being caused by the extra overhead information required by the HSCSD in the RLP frames. As to the present invention, the difference caused by the HSCSD in the PDUs and the RLP frames is not relevant and will not be described here in closer detail. The terms PDU and RLP in this application are used to refer to all the versions.

L2R unit 62 outputs the PDUs to RLP unit 63. RLP unit 63 inserts the PDUs in RLP frames and splits them in subchannels ch1–chn, where n is an integer and >2. A radio transceiver TRx carries out for each subchannel (following rate adaptation and channel coding) building of bursts, interleaving and modulation, and transmission over the radio interface in a corresponding subchannel time slot. The BTS radio transceiver TRx receives the bursts in the subchannel time slots, and carries out deinterleaving separately for each subchannel, and (following channel decoding) forwards the RLP frames of each subchannel ch1–chn to RLP unit 64 which combines the PDUs and feeds them to L2R unit 65. Between the BTS and IWF, the RLP frames have to be transferred in TRAU frames but this is not significant to the present invention.

When the user data rate in a HSCSD service substantially corresponds with the maximum capacity allocated to the connection, full PDUs are transmitted on all subchannels. If, as noted earlier, the user data rate in a HSCSD service is lower than the maximum capacity of the radio link protocol, L2R unit 62 may build partially filled PDUs and transmit them over the radio interface subchannels in RLP frames. Conventionally, however, the transmission has been distributed arbitrarily on all the subchannels ch0–chn, with the result that all the subchannels are more or less active.

According to the present invention, RLP unit 63 uses for transmitting RLP frames only a specific portion of the subchannels ch1–chn in cases the maximum data transfer capacity allocated to the connection is not required. On the other, unused subchannels, there is no transmission present at all, or they have a channel-specific DTX. The minimum number of subchannels used is defined according to the actual data user rate into the L2R unit, and the need for any additional channels is defined according to the buffered data amount. This will be described in the exemplary embodiment below with reference to FIG. 6.

The amount of input data, and the fill level of the buffers in the L2R unit 62 and RLP unit 63 are monitored by a DTX control unit 61. At first, it is assumed that the maximum transfer capacity allocated to a data call is three traffic channels, i.e. 3×9.6 kbit/s =28.8 kbit/s. DTX control 61 monitors the actual user data rate of the data flow into L2R unit 62. If the average user data rate exceeds the capacity of two subchannels, i.e 19200 kbit/s, the minimum capacity required will be three subchannels, i.e the same as the maximum capacity allocated to the data link. If that is the case, DTX control 61 directs RLP unit 63 to transmit in the normal manner on all three subchannels.

It is further assumed that the average user data rate into L2R unit 62 drops during the call to a value lower than 19.2 kbit/s, e.g. 18 kbit/s. DTX control 61 defines a minimum number of traffic channels for the aforementioned average user data rate of 18 kbit/s, i.e. two subchannels. DTX control unit 61 thereby directs RLP unit 63 to actively transmit on only two subchannels, for example on subchannels ch1 and ch2. Transmission on the third subchannel ch3 will be temporarily interrupted or discontinuous transmission DTX according to the GSM specifications will be activated on it. In such a case, RLP unit 63 transmits, to the subchannel ch3, L2 fill frames according to the GSM recommendation 04.06, item 5.4.2.3. The TRX receives these RLP frames from RLP unit 63, but only forwards them onto the radio path in specific TDMA frame subgroups, specified in the GSM recommendation 05.08, item 8.3. At other times, the subchannel has no transmission in the DTX mode.

DTX control 61 continues to monitor the average user data rate, and simultaneously monitors at least the fill level of the RLP unit 63 buffer. The RLP buffer contains both the RLP frames to be transmitted for the first time and RLP frames already transmitted to which no acknowledgement has yet been received from the receiving end. DTX control 61 may have e.g. two threshold values for the buffer fill level. When the fill level of the RLP buffer is below a specific threshold value, DTX control 61 considers the present number of subchannels to be adequate. If the buffer fills to this threshold value, DTX control 61 considers the present number of subchannels to be inadequate for data transmission. This leads to DTX control 61 deactivating DTX from subchannel ch3. RLP unit 63 begins to transmit user data in RLP frames on subchannel ch3, too, even though the minimum capacity corresponding to the average user data rate of 18 kbit/s is two subchannels. As a result, the RLP unit 63 buffer begins to empty. As soon as the buffer empties down to the lower predetermined threshold value, DTX control 61 considers the minimum capacity corresponding to the average user data rate, i.e two subchannels, to be adequate for transmission. Consequently, DTX control 61 reactivates DTX on subchannel ch3. RLP unit 63 recommences transmitting RLP frames containing user data only via subchannels ch1 and ch2. Via subchannel ch3, fill frames are transmitted.

If the average user data rate drops to lower than 9.6 kbit/s, the minimum capacity required is one subchannel. In such a case, the DTX mode will also be activated e.g. on subchannel ch2, and user data is only transmitted on subchannel ch1. DTX control 61 continuously monitors the buffer fill level of RLP unit 63, and if necessary deactivates DTX from one or more subchannels.

If the average user data rate again gains a value higher than 19.2 kbit/s, DTX control 61 again takes all the allocated subchannels ch1–ch3 in normal use.

Alternatively, the fill level of the buffer in RLP unit 63 may have several threshold values in both directions. Upon filling of the buffer to a specific threshold value, DTX is deactivated from one or more subchannels; upon reaching the next threshold value, DTX is again deactivated from one or more subchannels, etc. In a similar manner, as the buffer empties to a threshold value, DTX is reactivated on one or more subchannels; as the next threshold values is reached, DTX is again activated on one or more subchannels, etc.

At the receiving end, the BTS and the IWF operate as normal, receiving on all subchannels. DTX on specific subchannels is dealt with according to the GSM recommendations.

The invention is most advantageous when applied to a MS transmission. The method is also applicable when transmitting from the mobile communication network to the mobile station, whereby lower radio interference in the mobile communication network is achieved.

As noted above, for determining the user data rate and monitoring the buffer fill level, different kind of statistical methods can be applied. Also, as noted above, the traffic channels to be used at any one time may be selected according to a specific preference list.

Figure 7:
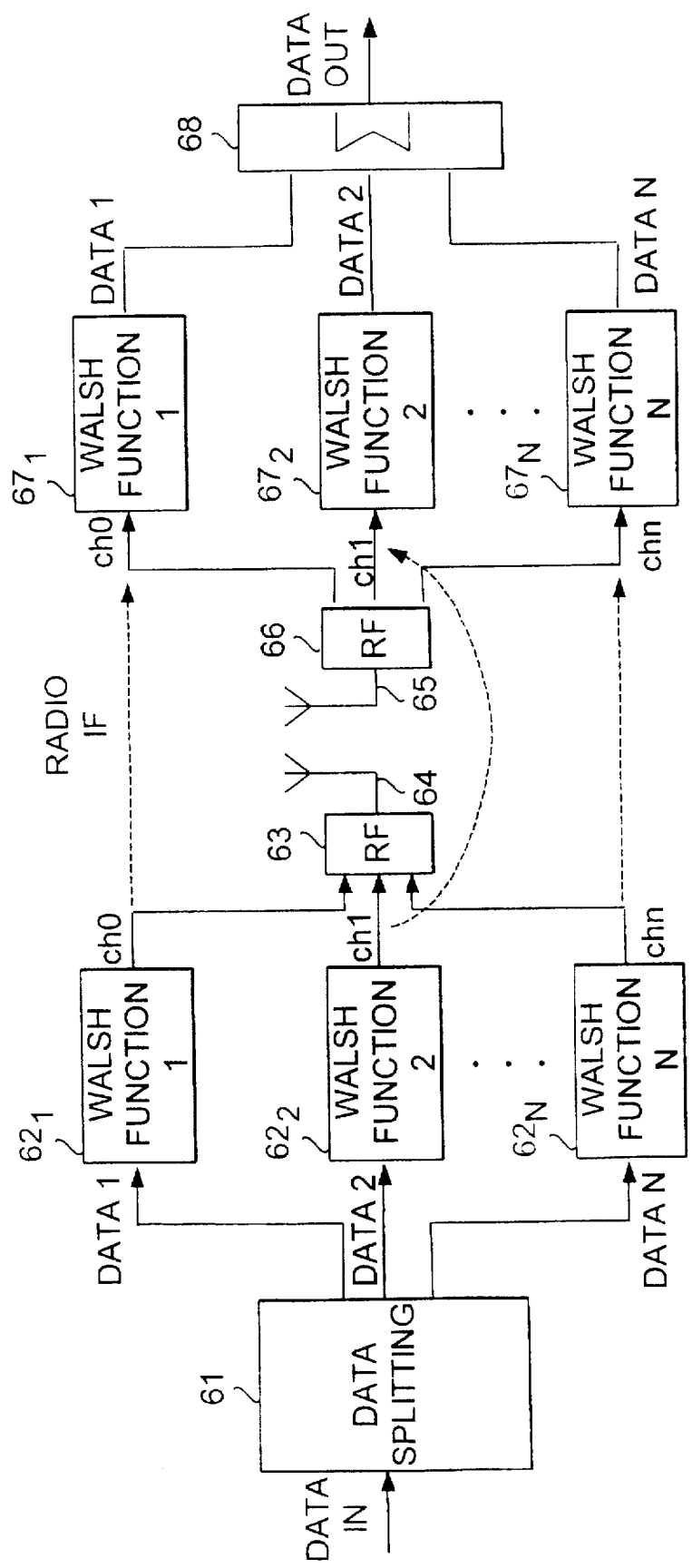
FIGS. 7, 8A and 8B illustrate high-speed data transmission according to the invention over N parallel CDMA traffic channels.

As noted above, the present invention is universally applicable on various kinds of multiple access methods and traffic channels. In CDMA systems the traffic channels are defined by pseudorandom noise (PN) codes, i.e. spreading codes, assigned to each user or connection. From the point of view of the present invention, the CDMA traffic channel is similar to the TDMA traffic channel. The basic contribution of the present invention is to allocate parallel traffic channels to a single user so as to provide a high-speed data connection. Such a high-speed data transmission according to the present invention over N parallel CDMA traffic channels is illustrated in FIG. 7. A high-speed data signal DATAIN that is to be transmitted over the radio path is divided in a data splitter 61 into the required number of slower-speed data signals DATA1 ... DATAN. A respective number N of parallel CDMA traffic channels ch0 ... chn is allocated for the transmission. In other words, an unique spreading code is allocated for each slower-speed signal DATA1 ... DATAN in order to distinguish them from each other during simultaneous transmission over the radio interface. The spreading codes of the system are preferably selected in such a way that the codes used in each system cell are mutually orthogonal, i.e. they do not correlate with each other. One class of suitable orthogonal binary sequences is called the Walsh function. In the embodiment shown in FIG. 7 the traffic channel separation is done by coding (multiplying) each lower-speed data stream DATA1 ... DATAN by modified Walsh functions 1 ... N of length 255 in respective Walsh encoders $62_1 \ldots 62_N$, in order to spread the data streams in bandwidth. The Walsh function is modified so that last bit of all of the functions have been deleted. The spread-spectrum data streams are fed through radio frequency (RF) parts 63 to an antenna 64 for transmission over the radio interface.

The RF signal received at receiving antenna 65 is fed through radio frequency (RF) parts 66 and split in parallel to correlator branches $67_1 \ldots 67_N$. Correlators $67_1 \ldots 67_N$ are Walsh decoders each of which decodes (multiplies) the received spread-spectrum signal by the Walsh function $1 \ldots N$ of the respective CDMA traffic channel ch0 ... chn, in order to despread the signal in bandwidth and to restore the original bandwidth of the respective slow-speed data stream DATA1 ... DATAN. The restored slow-speed data streams DATA1 ... DATAN are combined in a combiner 68 into a high-speed data stream DATAOUT.

A data transmission according to the present invention through the parallel CDMA traffic channels can thus be according to similar principles as described above for TDMA traffic channels. The only difference is that spreading codes (eg. Walsh functions) will be used instead of time slots as traffic channels.

Typically, there are various coding and signal processing operations, such as channel coding (convolutional coding), symbol repetition, interleaving, etc., involved with the data transmission. These additional operations are not essential in the point of view of present invention. In the embodiment of FIG. 7, it is assumed that these coding and interleaving operations, if any, are done to the high-speed data streams DATAIN and DATAOUT prior to the data splitting 61 and subsequent to data combining 68.

Figure 8A:
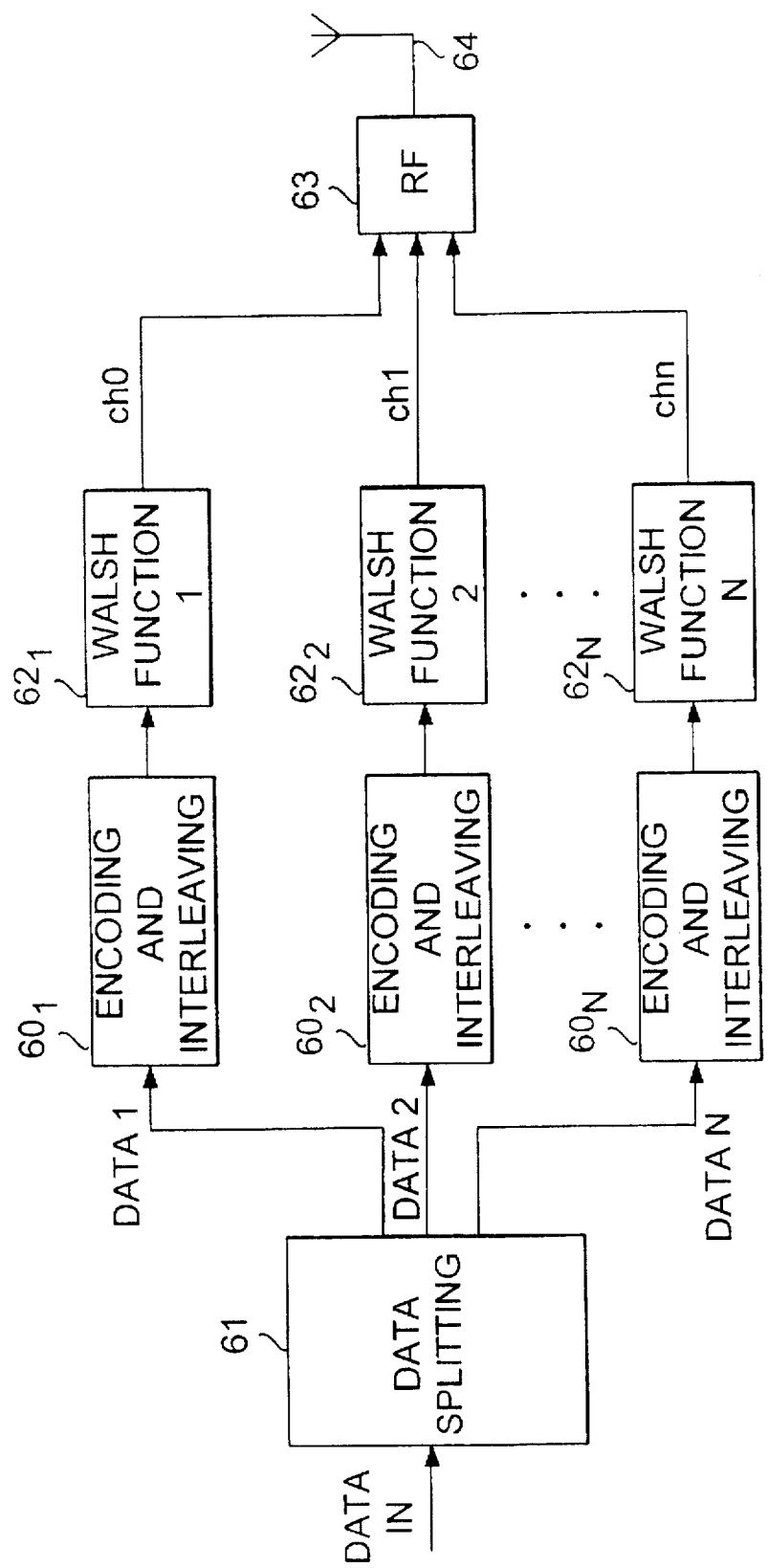
Figure 8B:
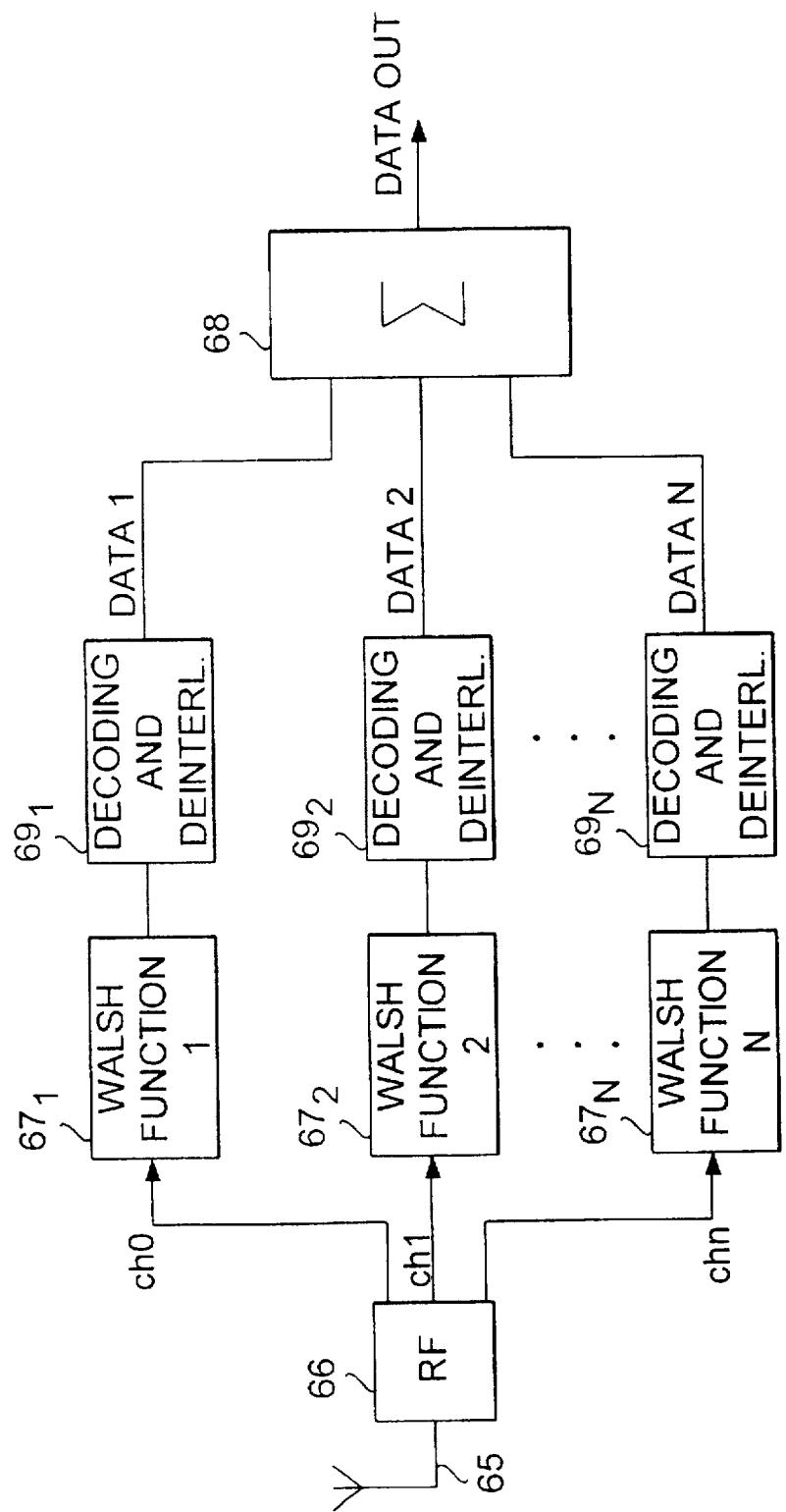

In another embodiment illustrated in FIGS. 8A and 8B, the channel coding, interleaving and other additional operations are done separately on each slow-speed data stream DATA1 ... DATAN. To this end, encoding and interleaving blocks $60_1 \ldots 60_N$ are provided between the data splitter 61 and the Walsh encoders $62_1 \ldots 62_N$ in the transmitter of FIG. 8A. Similarly, decoding and deinterleaving blocks $69_1 \ldots 69_N$ are provided between the Walsh decoders $67_1 \ldots 67_N$ and the data combiner 68 in the receiver of FIG. 8B.

Figure 9:
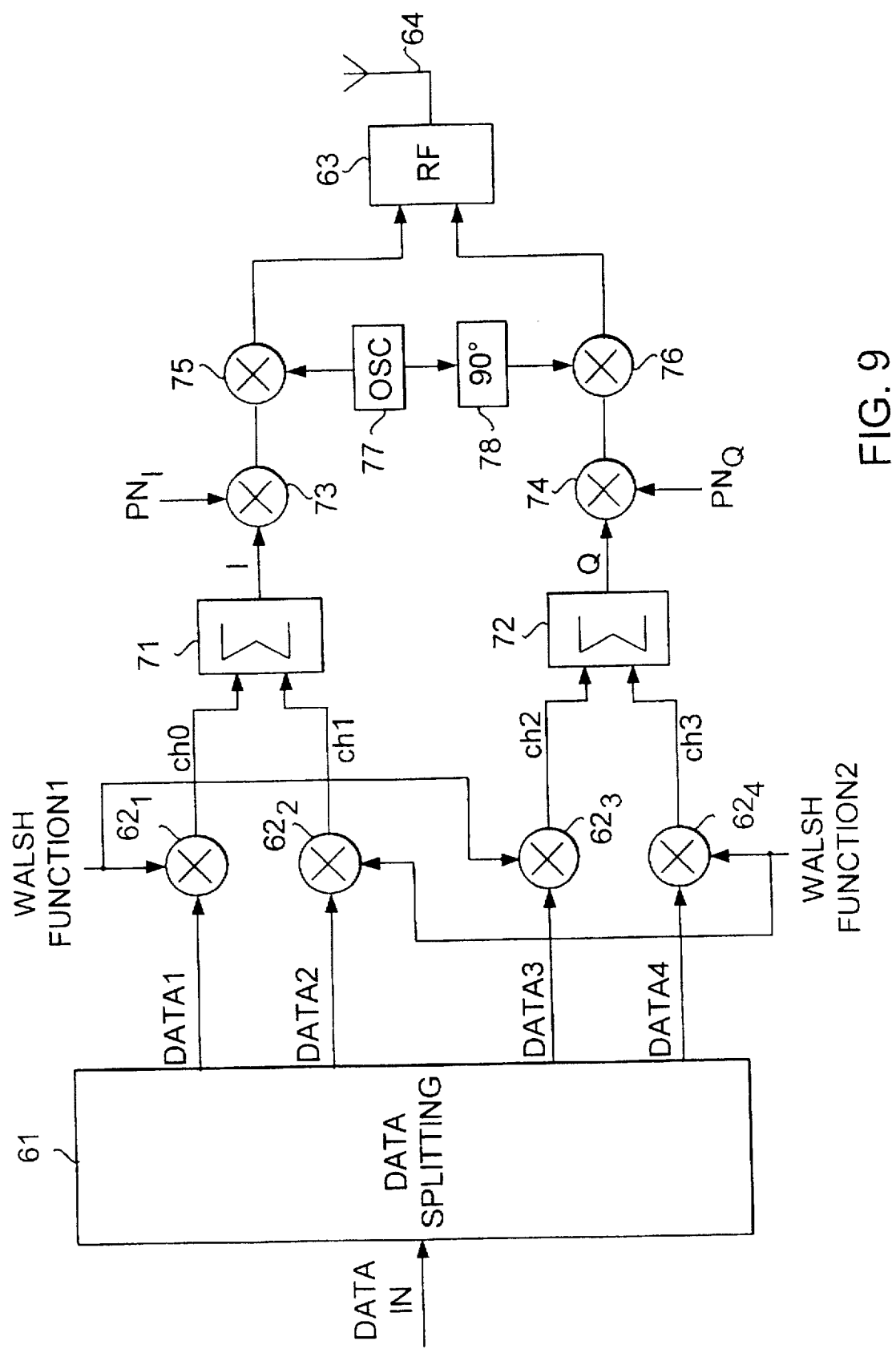
FIG. 9 shows a CDMA transmitter in which four CDMA traffic channels can be divided between quadrature (Q) and in-phase (I) branches in a QPSK modulator.

The RF parts 63 and 66 normally comprise transmitting and receiving filters. Often also a QPSK (Quadrature Phase Shift Keying) modulator is used. FIG. 9 shows an example of how four channels can be divided between quadrature (Q) and in-phase (I) branches in a QPSK modulator. High-speed data signal DATAIN is split into slow-speed data streams DATA1 ... DATA4 and fed to multipliers $62_1 \ldots 62_4$ (Walsh encoders), respectively. In multipliers $62_1$ and $62_3$, data streams DATA1 and DATA3 are multiplied by Walsh function 1. Similarly, in multipliers $62_2$ and $62_4$, data streams DATA2 and DATA4 are multiplied by Walsh function 2. The outputs of multipliers $62_1$ and $62_2$ are summed in summing block 71, and fed to the I branch of the QPSK modulator. The outputs of multipliers $62_3$ and $62_4$ are summed in summing block 72, and fed to the Q branch of the QPSK modulator. The signals of the I and Q branches are multiplied by different spreading codes $PN_1$ and $PN_Q$ in multipliers 73 and 74, respectively. The actual spreading is done by these "outer" spreading codes. The resulting I and Q signals multiplied by the in-phase (from local oscillator 77) and quadrature (via 90 degree phase shifter 78 from the oscillator 77) oscillator signals, and fed through other RF parts 63 to antenna 64.

In CDMA systems, additional parallel subchannels can be maintained by lowering their data rate and power level to as low a level as possible and by transmitting empty frames. This represents an alternative solution to the discontinuous transmission described above in connection with TDMA.

The figures and the explanation related thereto are only intended to illustrate the present invention. The method of the invention may vary in its details within the scope of the attached claims.

We claim:

1. A method for high-speed data transfer in a digital mobile communication system, comprising the steps of:
   establishing a non-transparent data connection having a number of parallel subchannels allocated on the radio interface, said number being determined by a specific maximum transfer capacity;
   transmitting user data over the non-transparent data connection in data frames by employing a communication protocol which retransmits defective data frames;
   buffering data frames to be transmitted in a transmission buffer;
   monitoring the actual user data rate on the terminal interface,
   monitoring fill level of the transmission buffer,
   transmitting user data in data frames via specific one or ones of said allocated subchannels, the number of said specific ones of said allocated subchannels depending on the actual user data rate and the fill level of the buffer,
   interrupting transmission on the remaining one or ones of said allocated subchannels which do not belong to said specific ones of said allocated subchannels, if any.

2. A method for high-speed data transfer in a digital mobile communication system, comprising the steps of:
   establishing a non-transparent data connection having a number of parallel subchannels allocated on the radio interface, said number being determined by a specific maximum transfer capacity;
   transmitting user data over the non-transparent data connection in data frames by employing a communication protocol which retransmits defective data frames;
   buffering data frames to be transmitted in a transmission buffer;
   monitoring the actual user data rate on the terminal interface,
   monitoring fill level of the transmission buffer,
   transmitting user data in data frames via specific one or ones of said allocated subchannels, the number of said specific ones of said allocated subchannels depending on the actual user data rate and the fill level of the buffer,
   activating discontinuous transmission on the remaining one or ones of said allocated subchannels which do not belong to said specific ones of said allocated subchannels, if any.

3. A method for high-speed data transfer in a digital mobile communication system, comprising the steps of
   establishing a non-transparent data connection having a number of parallel subchannels allocated on the radio interface, said number being determined by a specific maximum transfer capacity;
   transmitting user data over the non-transparent data connection in data frames by employing a communication protocol which retransmits defective data frames;
   buffering data frames to be transmitted in a transmission buffer;
   monitoring the actual user data rate on the terminal interface,
   monitoring fill level of the transmission buffer,
   transmitting user data in data frames via specific one or ones of said allocated subchannels, the number of said specific ones of said allocated subchannels depending on the actual user data rate and the fill level of the buffer, reducing the transfer rate to as low a level as possible on the remaining one or ones of said allocated subchannels which do not belong to said specific ones of said allocated subchannels, if any.

4. A method as claimed in claim 1, 2 or 3, comprising the steps of:

determining the minimum number of subchannels, corresponding to the actual user data rate, transmitting user data in data frames via said specific one or ones of said subchannels the number of which at least equals said minimum number of subchannels, changing dynamically the number of said specific ones of said allocated subchannels according to the fill level of the transmission buffer.

5. A method as claimed in claim 4, wherein the dynamic changing of the number of said specific ones of said subchannels comprises the steps of:

continuing transmission, deactivating discontinuous transmission, or reducing transfer rate on said remaining one or ones of said allocated subchannels, if the transmission buffer fill level reaches a first threshold value, interrupting transmission, activating discontinuous transmission, or reincreasing the transfer rate on said remaining one or ones of said allocated subchannels, if the transmission buffer fill level decreases to a second threshold value.

6. A method as claimed in claim 1, 2 or 3, comprising the step of:

transmitting user data via all the allocated subchannels if said minimum number of subchannels matches the number of subchannels allocated for the data connection.

7. A method as claimed in claim 1, 2 or 3, wherein said digital mobile communication system is a code division multiple access (CDMA) system, and said traffic channels are CDMA traffic channels.

8. A method as claimed in claim 7, wherein said CDMA traffic channels are distinguished from each other by different spreading codes.

9. A method as claimed in claim 7, wherein said traffic channels are distinguished from each other by different Walsh functions.

10. A digital mobile communication system comprising a transmitting party having a transmission buffer;

a receiving party;

a multichannel non-transparent data connection between the two parties, said multichannel data connection having parallel subchannels allocated on a radio interface, the number of said allocated subchannels being determined by a specific maximum transfer capacity;

a communication protocol in which data is transferred over said multichannel data connection in data frames so that defective data frames received are retransmitted, said transmission buffer buffering the data frames to be transmitted the transmitting party being arranged to monitor the actual user data rate and the fill level of the transmission buffer, the transmitting party being arranged to transmit user data in data frames via specific one or ones of said allocated subchannels, the number of said specific ones of said allocated subchannels depending on the actual user data rate and the fill level of the buffer, and to interrupt transmission on the remaining one or ones of said allocated subchannels, if any.

11. A digital mobile communication system comprising a transmitting party having a transmission buffer;

a receiving party;

a multichannel non-transparent data connection between the two parties, said multichannel data connection having parallel subchannels allocated on a radio interface, the number of said allocated subchannels being determined by a specific maximum transfer capacity;

a communication protocol in which data is transferred over said multichannel data connection in data frames so that defective data frames received are retransmitted, said transmission buffer buffering the data frames to be transmitted, the transmitting party being arranged to monitor the actual user data rate and the fill level of the transmission buffer, the transmitting party being arranged to transmit user data in data frames via specific one or ones of said allocated subchannels, the number of said specific ones of said allocated subchannels depending on the actual user data rate and the fill level of the buffer, and to activate discontinuous transmission on the remaining one or ones of said allocated subchannels, if any.

12. A digital mobile communication system comprising a transmitting party having a transmission buffer;

a receiving party;

a multichannel non-transparent data connection between the two parties, said multichannel data connection having parallel subchannels allocated on a radio interface, the number of said allocated subchannels being determined by a specific maximum transfer capacity;

a communication protocol in which data is transferred over said multichannel data connection in data frames so that defective data frames received are retransmitted, said transmission buffer buffering the data frames to be transmitted, the transmitting party being arranged to monitor the actual user data rate and the fill level of the transmission buffer, the transmitting party being arranged to transmit user data in data frames via specific one or ones of said allocated subchannels, the number of said specific ones of said allocated subchannels depending on the actual user data rate and the fill level of the buffer, and to reduce the transfer rate to as low a level as possible on the remaining one or ones of said allocated subchannels, if any.

13. A system as claimed in claim 10, 11 or 12, wherein the transmitting party is a terminal adapter of the mobile station, and the receiving party is a network adaptor of the mobile communication network.

14. A system as claimed in claim 10, 11 or 12, wherein the transmitting party is a network adaptor of the mobile communication network, and the receiving party is a terminal adaptor of the mobile station.

15. A system as claimed in claim 10, 11 or 12, wherein said digital mobile communication system is a code division multiple access (CDMA) system, and said subchannels are CDMA traffic channels.

16. A system as claimed in claim 15, wherein said CDMA traffic channels are distinguished from each other by different spreading codes.

17. A system as claimed in claim 15, wherein said traffic channels are distinguished from each other by different Walsh functions.

18. A data transmitter for data transmission over a multichannel non-transparent data connection in a digital mobile communication system, said multichannel data connection having parallel subchannels allocated on a radio interface, the number of said allocated subchannels being determined by a specific maximum transfer capacity, and said data transmission on said multichannel connection having a communication protocol in which data is transferred over said multichannel data connection in data frames so that defective data frames received are retransmitted, said data transmitter comprising a transmission buffer for buffering the data frames to be transmitted, a controller arranged to monitor the actual user data rate and the fill level of the transmission buffer, said data transmitter being arranged to transmit user data in data frames via specific one or ones of said allocated subchannels, the number of said specific ones of said allocated subchannels depending on the actual user data rate and the fill level of the transmission buffer, and to interrupt transmission on the remaining one or ones of said allocated subchannels, if any.

19. A data transmitter for data transmission over a multichannel non-transparent data connection in a digital mobile communication system, said multichannel data connection having parallel subchannels allocated on a radio interface, the number of said allocated subchannels being determined by a specific maximum transfer capacity, and said data transmission on said multichannel connection having a communication protocol in which data is transferred over said multichannel data connection in data frames so that defective data frames received are retransmitted, said data transmitter comprising a transmission buffer for buffering the data frames to be transmitted, a controller arranged to monitor the actual user data rate and the fill level of the transmission buffer, said data transmitter being arranged to transmit user data in data frames via specific one or ones of said allocated subchannels, the number of said specific ones of said allocated subchannels depending on the actual user data rate and the fill level of the transmission buffer, and to activate discontinuous transmission on the remaining one or ones of said allocated subchannels, if any.

20. A data transmitter for data transmission over a multichannel non-transparent data connection in a digital mobile communication system, said multichannel data connection having parallel subchannels allocated on a radio interface, the number of said allocated subchannels being determined by a specific maximum transfer capacity, and said data transmission on said multichannel connection having a communication protocol in which data is transferred over said multichannel data link in data frames so that and defective data frames received are retransmitted, said data transmitter comprising a transmission buffer for buffering the data frames to be transmitted, a controller arranged to monitor the actual user data rate and the fill level of the transmission buffer, said data transmitter being arranged to transmit user data in data frames via specific one or ones of said allocated subchannels, the number of said specific ones of said allocated subchannels depending on the actual user data rate and the fill level of the transmission buffer, and to reduce the transfer rate to as low a level as possible on the remaining one or ones of said allocated subchannels, if any.

21. A data transmitter as claimed in claim 18, 19 or 20, wherein said data transmitter is a mobile station.

22. A data transmitter as claimed in claim 18, 19 or 20, wherein said data transmitter a network adaptor of the mobile communication network.

23. A data transmitter as claimed in claim 18, 19 or 20, wherein said digital mobile communication system is a code division multiple access (CDMA) system, and said subchannels are CDMA traffic channels.

24. A data transmitter as claimed in claim 23, wherein said CDMA traffic channels are distinguished from each other by different spreading codes.

25. A data transmitter as claimed in claim 23, wherein said traffic channels are distinguished from each other by different Walsh functions.

* * * * *